United States Patent [19]
Taddei

[11] 3,972,025
[45] July 27, 1976

[54] EXPANDED MEMORY PAGING FOR A PROGRAMMABLE MICROPROCESSOR

[75] Inventor: Vincent J. Taddei, West Chester, Pa.

[73] Assignee: Burroughs Corporation, Detroit, Mich.

[22] Filed: Sept. 4, 1974

[21] Appl. No.: 503,112

[52] U.S. Cl. .................................. 340/172.5
[51] Int. Cl.$^2$ ................. G06F 9/16; G06F 13/00
[58] Field of Search .................. 445/1; 340/172.5

[56] References Cited
UNITED STATES PATENTS

| | | | |
|---|---|---|---|
| 3,601,809 | 8/1971 | Gray et al. | 340/172.5 |
| 3,648,255 | 3/1972 | Beausoleil et al. | 340/172.5 |
| 3,675,214 | 7/1972 | Ellis et al. | 340/172.5 |
| 3,736,567 | 5/1973 | Lotan et al. | 340/172.5 |
| 3,745,532 | 7/1973 | Erwin | 340/172.5 |
| 3,755,788 | 8/1973 | Finch | 340/172.5 |
| 3,766,532 | 10/1973 | Liebel | 340/172.5 |
| 3,766,533 | 10/1973 | Black et al. | 340/172.5 |
| 3,786,434 | 1/1974 | Frye et al. | 340/172.5 |
| 3,786,436 | 1/1974 | Zelinski et al. | 340/172.5 |
| 3,878,514 | 4/1975 | Faber | 340/172.5 |

*Primary Examiner*—Gareth D. Shaw
*Assistant Examiner*—Jan E. Rhoads
*Attorney, Agent, or Firm*—Kevin R. Peterson; Edward Feeney, Jr.; Leonard C. Brenner

[57] ABSTRACT

For a serial-bit, programmable microinstruction processor having serial-byte internal transfers, an expanded-memory addressing apparatus and method is provided by the incorporation into the processor system a plurality of external memory units and a selection and transfer circuitry for accessing external memory space from within the processor. The accessing of external memory locations may be controlled by programmed memory access command instructions. These instructions may be operated upon by decoding components and buffer storage components to make available, concurrently, the entire contents of a particular one of the external memory units. Once a particular memory, or page is selected, a location within that page may then be addressed by memory address registers within the base processor.

7 Claims, 5 Drawing Figures

EXPANDED MEMORY PAGING FOR A PROGRAMMABLE MICROPROCESSOR

BACKGROUND OF THE INVENTION

The present invention relates to a digital computer and more particularly to a microprogrammable digital processor, memory, logic and control and addressing structure which may be implemented in TTL logic or as an LSI (large scale integration) chip. Moreover, this invention particularly relates to a processor apparatus and method for the microinstruction memory addressing of expanded memory space connected, externally, to the processor. The subject invention, furthermore, is designed for a particular type of microprogrammable units as embodied in the teachings of Faber in patent application U.S. Ser. No. 307,863, now U.S. Pat. No. 3,878,514, filed Nov. 20, 1972 and assigned to the assignee of the present application. The programmable unit disclosed therein is a self-contained serial-bit-by-byte processor employing a soft machine architecture through microprogramming. An instruction set, at the microprogram level, is provided for controlling the specific circuitry of the processor in executing basic computer operations. Essentially, the specific circuitry represents minimally committed logic or hardware which becomes committed to a specific task by control signals originating in the instruction set. Logic, control and addressing functions are performed by circuitry which includes only those gates, registers, drivers, and related logic, which are necessary to implement the basic operations.

Such a processing unit may be comprised of five functional parts: (1) a logic unit which performs shifting, arithmetic and logic functions; (2) a microprogram memory which stores both literals and control words; (3) a memory control unit which provides the registers microprogram memory addressing; (4) a control unit which provides timing and conditional control, successor determination and instruction decoding; and (5) an external interface.

In the microprocessor, cited above, a microprogram memory (MPM) is addressed by a memory program count register (MPCR). Feeding this (MPCR) register is an alternate memory program count register (AMPCR). The AMPCR receives instructions from the microprogram memory as well as from other registers within the processor.

Microprocessors of the Faber type are being used in larger and more complicated processing tasks than for which they were originally designed. While this processor's logic units and control units are sophisticated enough to handle the enlarged processing tasks, the micromemory capacity as designed into the basic apparatus is not large enough. This disadvantage exists in most microprocessors in the class of Faber-size processors. The compactness of the basic processor as implemented in a single MOS chip or in a single TTL-printed circuit card unit did not, with yesterday's technology, permit extensive micromemory capacity.

It is, therefore, desirable to be able to increase micromemory capacity. One approach is to connect external memory modules to the basic processor, accessing external memory locations from within the processor, and calling in instructions and data words from the external locations as needed. However, when the basic processor is one wherein component-resources, such as buffer capacities, and address register capacities, are already fully utilized, the implementation of increased micromemory capacity via externally coupled memories is not easily accomplished.

An objective of this invention therefore is to provide an apparatus for accessing external micromemory capacity from within a microprocessor.

Another objective of this invention is to provide an apparatus for accessing microinstruction memory locations external to a microprocessor without the alteration of the hardware design of the basic microprocessor.

A further objective of this invention is to provide simplified firmware for driving the external micromemory apparatus with the base processor, operating within pre-existing format specification.

SUMMARY OF THE INVENTION

The objectives of this invention are realized by an expanded-memory paging apparatus and method for a bit-serial programmable microprocessor wherein a number of processor-external microprogram memories may be addressed from within the microprocessor for conducting normal microprogram operations. Available memory locations may be addressed consistent with memory addresses instruction addresses as defined within the microprocessor operation periods.

A plurality of identical micromemory modules may be connected to the base microprocessor via the paging apparatus for expanding in predetermined increments the memory space available to the microprocessor.

Included in the paging apparatus may be a decoding apparatus for reading memory access instructions for selecting the proper memory module to be accessed. Temporary storage registers may be associated with this decoding apparatus as well as with interlocking and timing circuitry for temporarily holding memory module or page designations for sequencing paging operations to base processor operation periods.

All information is received from and sent to the base processor in serial form. Information transfer within the paging apparatus may be in parallel.

Firmware microinstructions may be resident within the system to control the operation of the paging apparatus.

DESCRIPTION OF THE DRAWINGS

The features of this invention will become more fully apparent from the following detailed description, attached claims and accompanying drawings in which like characters refer to like parts and in which:

DETAILED DESCRIPTION

The invention is an apparatus which may be added to a microprogrammable processing system to enhance processing capabilities by making more microinstruction memory capacity available to the base processor without disrupting or altering the internal base processor structure. The apparatus is designed to be compatible with, but is not exclusively limited to, a serial-bit microprocessor described as follows.

Figure 1:
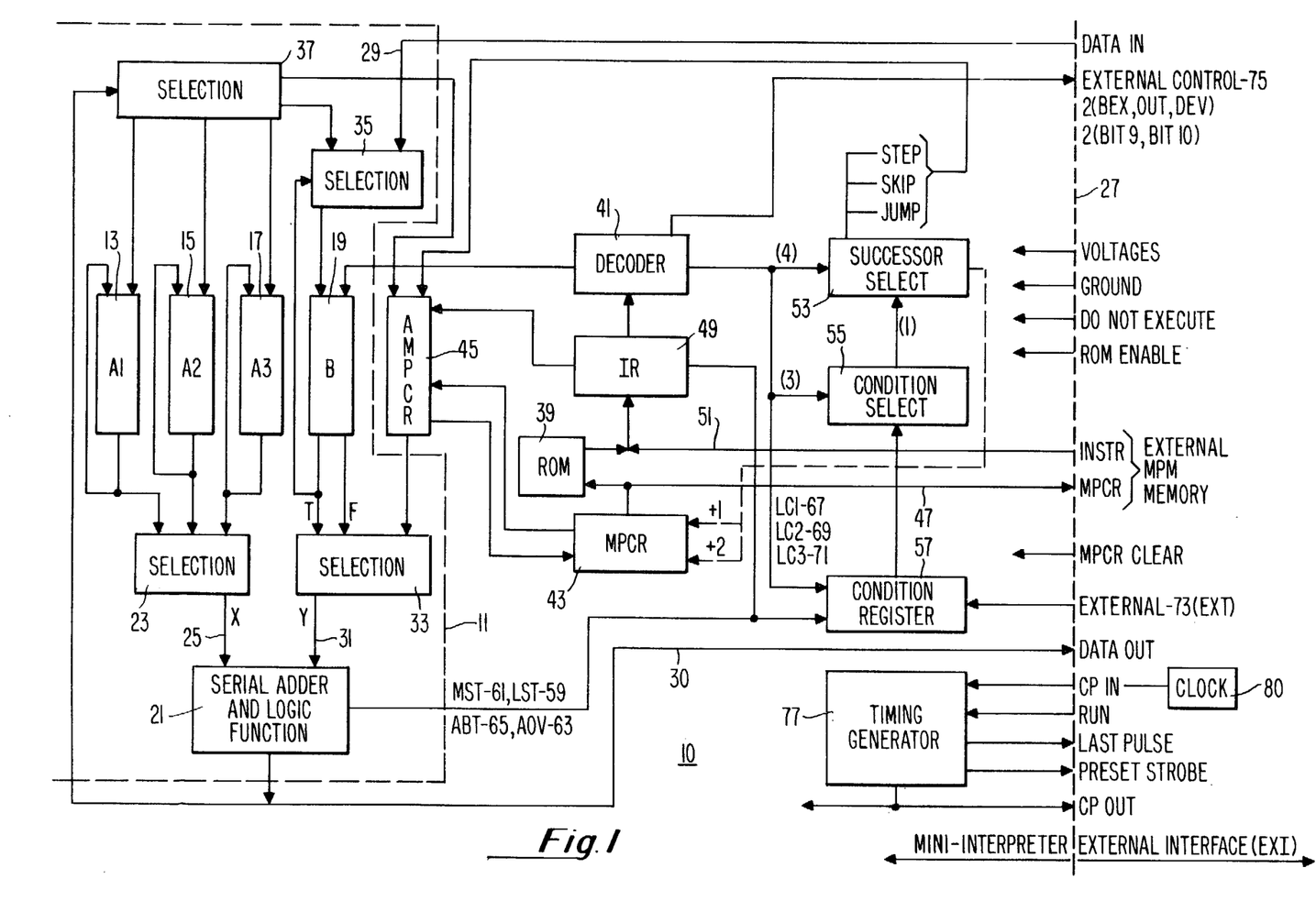
FIG. 1 is a detailed block diagram of the base processor.

The base microprocessor 10 includes a logic unit 11 (FIG. 1). The logic unit 11 is comprised of three 8-bit recirculating shift registers 13, 15, and 17 connected in parallel and denominated registers A1, A2 and A3, respectively, an 8-bit recirculating shift register 19, denominated the B register, and a serial adder 21. The recirculating capability of registers 13, 15, 17 and 19 enables information to be transferred into the adder 21 without changing the contents of the respective input register. Further functions of the processor as illustrated in this FIG. 1 will be brought out in the discussion below.

A registers 13, 15 and 17 are functionally identical and may be used to temporarily store data within the logic unit 11. A selection gate network 23 permits the contents of any of A registers 13, 15 or 17 to be loaded as one input, denominated the X input 25 of adder 21.

B register 19 is the primary interface into the processor. Data from external sources is entered via data interface 27 and DATA-IN bus 29. The B register 19 also serves as a second, or Y input 31 via a selection network 33 to the adder 21, and collects certain side effects of arithmetic operations. A selection network 35 selects the input to B register 19 from DATA-IN, external interface 27, the output of adder 21 via a selection network 37 or a recirculating feedback loop of the "true" contents of the B register 19 from its "true" output. Selection network 37 also permits the output of adder 21 to be fed to A registers 13, 15, 17. In addition, literal values which are decoded from certain microinstructions stored in an optional microprogram memory 39 are fed directly to the B register 19 via microinstruction decoder 41. As implied above, B register 19 has a true-false output which may be selected to be fed as the Y input 31 of adder 21 by the selection network 33. The purpose is to provide adder 21 with either the true value or the one's complement of the value in B register 19. Adder 21 is a conventional type serial adder as known in the art. The output of adder 21 besides being tied to components within the processor is connected via information-data out bus 30 to interface 27 for communication to devices external to the processor.

Microprogram memory (MPM) 39, is a 256 word, 12 bit, read-only memory which may optionally be included in the processor hardware configuration or which may be located externally to the processor and accessed via external interface 27. In this latter case an external memory capacity can be expanded via memory access circuitry.

A memory control unit comprises two 8-bit registers, i.e., a microprogram count register 43 (MPCR) and an alternate microprogram count register 45 (AMPCR). MPCR 43 is an 8-bit counter which can be incremented by one or two and is used to address MPM 39 (select each instruction from microprogram memory 39) or any external memories connected via bus 47 and interface 27. MPCR 43 may be expanded to 12 or 16 bits by the substitution of a 12 or 16 bit counter for the 8-bit counter.

AMPCR 45 can hold an alternate address which is needed for microprogram manipulation. When not required for this purpose, AMPCR 45 can be used by the logic unit 11 as a scratch pad register. The contents of AMPCR 45 can be fed to adder 21 as its Y input 31 via selection network or can be clocked directly into MPCR 43. AMPCR 45 can be loaded by the output from adder 21 via selection logic 37, or from MPCR 43 or from microprogram memory 39 (MPM) or from an instruction register 49 which is tied to the output of microprogram memory 39 or to external memories via bus 51. When more than 8 bits are to be transferred into AMPCR 47 they may be concatenated with the use of instruction register 49.

The microprogrammable processor 10 requires a source of microprogram instructions to define the operation of the processing unit 11. This source is provided by microprogram memory 39 or external microprogram memory which can either be a Read/Write or a Read Only memory. Memory 39 is a read-only memory (ROM) that contains the program defining the processing unit's function when the ROM enable line is true. ROM enable line select enables the instruction source to be from the internal memory 39 in the presence of a true bit, and from the external source in the presence of a false bit. In any event, the program stored in either the internal memory 39 or an external memory characterizes the processor unit to perform specific tasks in an optimum manner.

Presently, for purposes of discussion only, a ROM memory 39 will be considered. In the preferred embodiment, microprogram memory 39 is comprised of 256 words, each 12 bits in length. The memory 39, contains only executable instructions and cannot be changed under program control. Each microinstruction which comprises the microprogram stored in microprogram memory 39 is 12-bits in length and is decoded by the decoder 41. The 12-bits of each instruction are decoded into one of four types, namely (1) literal, (2) condition, (3) logic and (4) external. A more thorough discussion of these four instruction types will be described in detail later.

The processor control unit includes a microinstruction decoder 41, successor (or next instruction) determination logic 53, condition selection logic 55, and a condition register 57. The successor determination logic 53, the condition selection logic 55 and the condition register 57 are activated by the output of the microinstruction decoder 41. In addition, the adder 21 feeds four condition bits to the condition register 57, namely, the least significant bit true (LST) condition 59, the most significant bit true (MST) condition 61, the adder overflow bit (AOV) 63, and an all bits true indicator bit (ABT) 65 (if all bits of the adder output are true 1's). The successor determination logic 53 determines whether to use the contents of the MPCR, register 43, incremented by 1 or by 2, or to use the contents of AMPCR, register 45 for addressing the next instruction stored in microprogram memory 39 or external memories. Additionally, condition register 57 feeds 8 bits to condition select logic 55 which in turn selects one bit for transfer to successor select logic 53.

The condition register 57 stores three resettable local condition bits (LC1 bit 67, LC2 bit 69 and LC3 bit 71, respectively), and selects one of 8 condition bits (the 4 adder condition bits, MST bit 61, LST bit 59, AOV bit 63 and ABT bit 65; an external condition bit EXT 73; and the three local condition bits LC1, LC2 and LC3 stored in condition register 57).

External interface 27 connects the programmable unit with external elements related to a multiprocessing system. This connection is synchronized by one internally generated clock signal train available to aid in performing 8-bit serial transfers into and out of the programmable unit. The external asynchronous input EXT 73 to condition register 57 is available for signalling from the external environment in the form of the EXT condition bit, while the four external control lines 75, from decoder 41 are utilized to control the use of external registers.

The timing Generator 77, includes a hexadecimal counter and is interconnected to all components. In addition to generating basic clock pulses, it generates control pulses for information transfers within the system.

As stated above, memory 39 may or may not be included as part of the base processor. In the case where memory 39 is present in the base processor an address from MPCR 43 to micromemory 39 will contain an access bit enabling that particular instruction from MPCR 43 to operate upon the memory 39. All other addresses, i.e., addresses to external memory locations, are shunted via processor bus 47 and processor interface 27 to external memory locations.

In the case where micromemory 39 is not present in the base processor all instructions from MPCR 43 are directed via bus 47 and interface 27 to external memory locations.

Instruction register 49 accepts information either directly from micromemory 39, if present in the system, or from external memories via interface 27 and processor bus 51.

Figure 2:
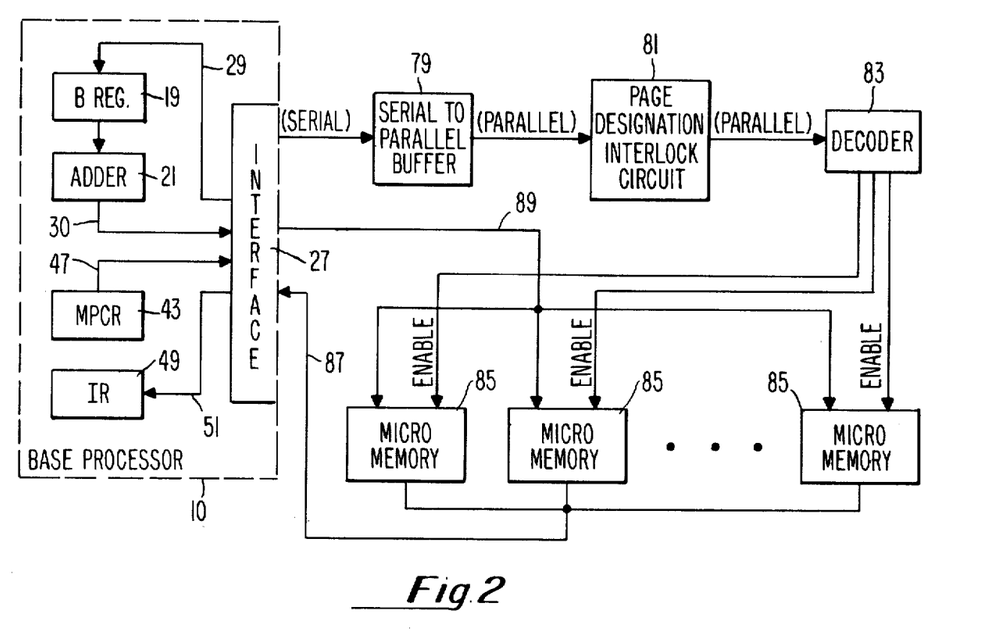
FIG. 2 is a general block diagram of the paging apparatus.

Operational component blocks included in the expanded memory paging apparatus are shown in FIG. 2. Connected to the processor's B register 19 via adder 21, data-out bus 30 and interface 27 is a serial to parallel buffer 79. An output from buffer 79 is connected to a page-designation interlock circuit 81. In addition, a decoder 83 is fed by interlock circuit 81. The output from decoder 83 comprises a plurality of enable lines, with one enable line being connected to the read-enable terminal of each of a plurality of microinstruction memories 85.

The outputs (from the output register) of the memories 85 are ganged together and connected via an information bus 87, processor interface 27 and processor bus 51 to the instruction register 49. The micromemories 85 are addressed via a common bus 89, by MPCR 43 via processor address line 47 and processor interface 27.

Micromemories 85 are read only memory ROM chips of the type, Texas Instrument (T.I.) number 74187. These chips have tri-state outputs and gated address inputs which eliminates the need for AND gates on the bus 89 input and OR gate on the bus 87 output. If it is desirable that each of the memories 85 be of 256 word capacity, three T.I. 74187 may be ganged together to form the 256 word capacity.

The paging apparatus of FIG. 2 must operate compatibly with the activity cycles of the base processor. The microprocessor (FIG. 1) has fixed operational cycles wherein external control 75 signals are available from the instruction decoder 41, as outputs via interface 27. These signals, as shown in FIG. 1, include BEX, OUT, DEV and are defined by two signal lines, N9 and N10, from the instruction register 49 via decoder 41; and two signal lines A and B generated from the decoder 41.

BEX is an instruction to an external device indicating that the processor is ready to receive data into B register 19 via data-in bus 29.

OUT is an instruction to an external device indicating that the processor is sending, via data-out bus 30, an instruction to an external register.

DEV is an instruction to an external device indicating that the processor is sending, via data-out bus 30, a "literal" to an external register. A "literal" is a non-instruction or operator word as defined in the above-cited Faber processor specification.

Also available from the processor (FIG. 1) timing generator 77, as an output from interface 27, is a pulse train CP out. CP is a repetitive pulse series of 8 pulses followed by two blank spaces. An input to timing generator 77 is clock pulse input (CP in). This pulse stream is transmitted via interface 27 from pulse generator or clock 80. CP in and CP out are in synchronism.

Other timing pulses available from the timing generator 77 are a preset strobe and a last strobe. The present strobe establishes the start of the operation period of the processor during which one operation or operation step is conducted. The last pulse defines the end of the operation period of the processor. The number of clock pulses which comprise an operation period may be varied, but most commonly the operation period is 8 clock pulses long, including the preset strobe and the last pulse. While the processor may be run at various speeds as determined by the basic timing generator, for present purposes the speed will be denoted as one megahertz. Under this condition an 8 clock pulse period is $8\mu$ seconds long.

Figure 3:
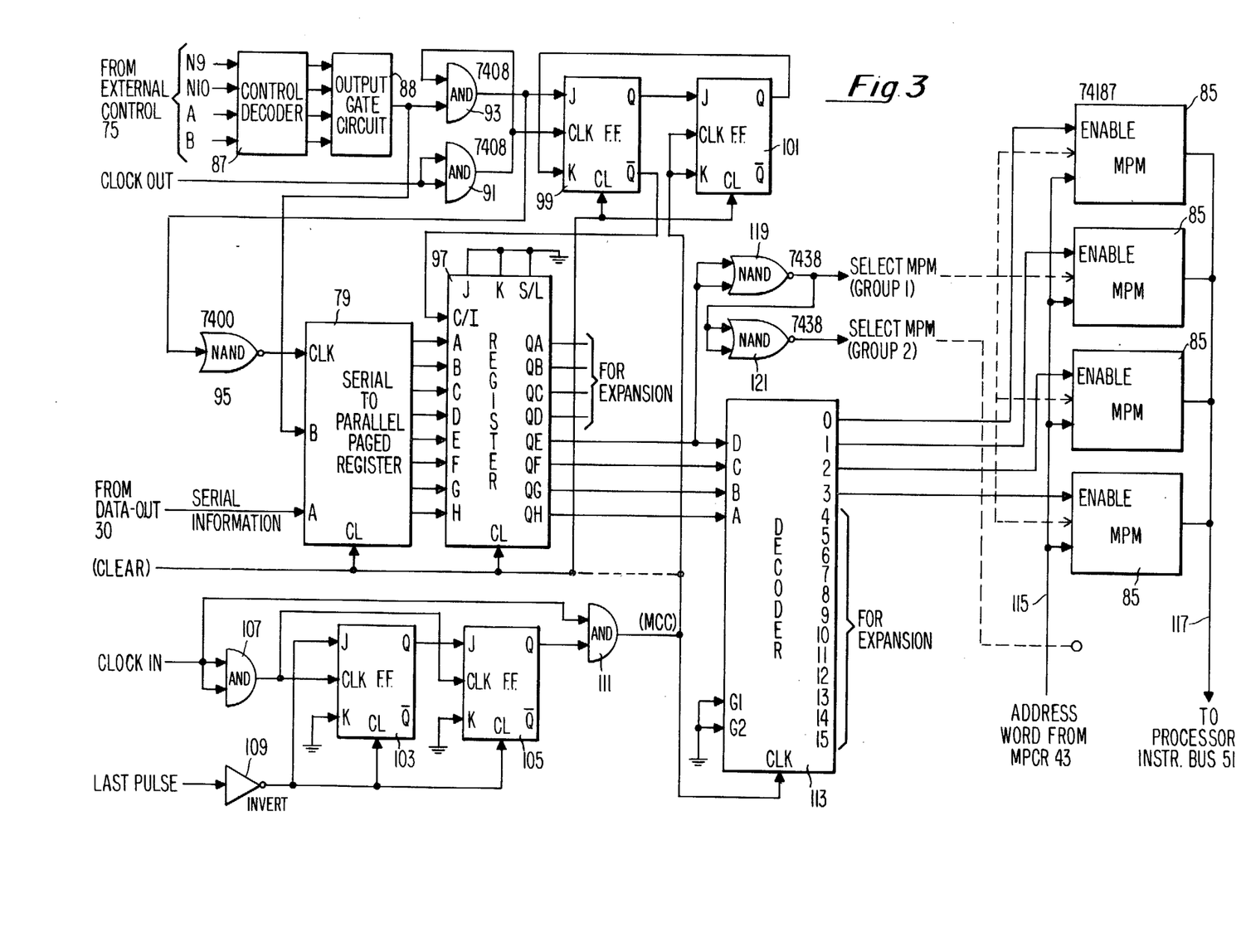
FIG. 3 is a more detailed diagram of the paging apparatus.

The buffer 79, the page designation and interlock circuit 81, the decoder 83 and the microprogram memories 85 are shown in greater detail in FIG. 3. For ease of discussion below, repeated references to interface 27 will be eliminated. Signals which are received from or sent to the microprocessor 10 will be discussed in reference to their component and/or bus designation within the microprocessor 10. However, it is to be understood that all signals enter and leave the microprocessor 10 via the interface 27.

Referring now to FIG. 3, control decoder 87 receives bits N9 and N10 and bits A and B from instruction decoder 41 (FIG. 1). Connected in parallel to the output of control decoder 87 is an OR-gate tree circuit 89.

The serial to parallel register 79 receives serial information from the data-out bus 30 on its A terminal, while the B terminal of this register 79 is connected to the output of gate circuit 88. Clock pulses to the clock input of register 79 are provided via AND gate 93 and NAND gate 95.

This pulse circuit also includes a two-input AND gate 91 which receives clock out pulses from timing generator 77, simultaneously on both of its inputs. The output of gate 91 is connected to an input of a two-input, AND gate 93. The other input of the AND gate 93 is tied to the output of the gate circuit 89. The output of the AND gate 93 is connected to the inputs of a NAND gate 95, while the output of NAND gate 95 drives the clock input to the register 79.

The serial to parallel register 79 stores data received serially on its A terminal when enabled on its B terminal, and clocks this stored data through as an 8-bit parallel output.

A buffer or page select register 97 has its 8-bit parallel input terminals connected to the 8-bit parallel outputs of register 79. The respective terminals are connected so that the most significant bit is entered on the A input terminal of register 97, the least significant bit on the H terminal of the register 97, with the other bits on respective terminals therebetween. The J, K and S/L terminals of register 97 are grounded.

An output from a dual J–K flip-flop interlocking circuit 99,101 drives the C/I terminal of the register 97.

This dual flip-flop circuit includes a first J-K flip-flop 99 with its J input connected to the output of And gate 93, and its clock input connected to the output of AND gate 91. The $\overline{Q}$ or complementary output of flip-flop 99 is connected to the C/I terminal of register 97.

A second J-K flip-flop 101 has its J-input connected to the Q-output of flip-flop 99. The clock and K inputs of flip-flop 101 are tied to the output of the memory cycle complete circuit which will be discussed below, while the Q output of flip-flop 101 connects to the K input of flip-flop 99.

The memory cycle complete circuit includes a pair of interconnected J-K flip-flops 103 and 105. Flip-flops 103 and 105 are each clocked from the system's basic "clock-in" signal via a two-input AND gate 107, which is used as a driver wherein its inputs are tied together. Moreover, flip-flops 103 and 105 are further inter-connected with the Q output of flip-flop 103 tied to the J-input of flip-flop 105. In addition, the K inputs of the flip-flops 103 and 105 are each grounded. A last pulse signal from timing generator 77 of processor 10 is fed to the clear terminals of the flip-flops 103 and 105 and to the J input to flip-flop 103 simultaneously, via an inverter 109. The Q output of flip-flop 105 is AND'ed through two-input AND gate 111 by the clock input signal from microprocessor 10 to yield the gate 111 output or memory cycle complete signal which, as described above, is fed to AND gate 91 and to flip-flop 101.

A decoder 113 obtains instructions from the page select register 97 and decodes these instructions to enable a reading of one of the microprogram memory pages 85. Connected to the four least-significant-bit output terminals (QE, QF, QG, QH) of the register 97 are the four least-significant-bit input terminals (D, C B, A) of the decoder 113, with QE tied to E, QF to C, QG to B, and QH to A respectively, between register 97 and decoder 113. Decoder 113 has its G1 and G2 inputs grounded and its clock input connected to the output of gate 111, the memory cycle complete signal. The output of the decoder 113 comprises a plurality of pins whereupon an enable, "high-signal", appears on only one pin at a time. In the present embodiment, decoder 113 has its "0" output pin connected to the enable gate of the first of 4 identical memory pages 85, its "1" output connected to the enable of the second memory 85, its "2" output connected to the enable of the third memory 85 and its "3" output connected to the enable of the fourth memory 85.

A clear pulse is connected to the clear or reset terminals of registers 79 and 97 and flip-flops 99 and 101. This clear pulse may be a function of the last pulse or the memory cycle complete signal. The circuit is easily reset by the memory cycle complete signal. When this is the case, for the circuit as shown by FIG. 3, the clear line is connected to the output of AND gate 111.

An address word bus 115 from the microprogram count register 43 which carries the address for a location within a page is connected to the address inputs of each of the memories 85. An output instruction bus 117 commonly connects all of the memories 85 outputs to processor 10 instruction bus 51. The choice of the memory module 85 with an enable controlled address input and tri-state type output eliminates the need for buffer gating, and permits input and output wires to each memory 85 to be ganged directly to the buses 115 and 117, respectively.

In the present embodiment, the specific manufacturers components utilized for the page select register 97 and the decoder 113, (further specified below), each have additional unused terminals. These terminals are to be utilized when the number of memories 85 (pages) are increased. While the hardware requirements for the instant circuit may be further optimized with the employment of a register 97 and a decoder 113 of the size needed to address exactly four memory pages, it may be desirable and in fact, more practical to be able to address additional pages without significantly changing the hard-wired circuitry. With this in mind, the instant circuit is designed with a register 97 and decoder 113 of a size to be able to address up to 16 microprogram memories 85.

A memory group select circuit may be utilized when the memory 85 pages in the system number more than four. This select can be driven by the quadralincremental bits of the page instruction which designate when a page amongst a grouping of four is being addressed. Given 8 memory 85 pages in a system, a select group 1 and select group 2 could be used. These respective select group signals would enable groups of four memories and would act as an error check on the addressing components.

A two-group select as shown in FIG. 3 includes a pair of two-input NAND gates 119, 121. The inputs of gate 119 are connected to the most significant bit of the four bit instruction fed into the decoder 113. The output of gate 119 is the "select group 1" enable signal which is available for the first group of memory 85 pages. The output of NAND gate 119 is also tied to the inputs of NAND gate 121. Similarly, to gate 119, the output of gate 121 is the "select group 2" enable signal which is available for the second group of memory 85 pages.

A partial listing of some of the components which may typically be used in the circuit includes:

| ITEM | REFERENCE CHARACTER | MANUFACTURER IDENTIFICATION |
|---|---|---|
| AND gate | 91, 93, 107, 109, 111 | Texas Instrument No. 7408 |
| NAND gate | 95, 119, 121 | Texas Instrument No. 7438 |
| J-K Flip-Flop | 99, 101, 103, 105 | Texas Instrument No. 7473 |
| Memory | 85 | Texas Instrument No. 74187 |
| Serial to Parallel Register | 79 | Texas Instrument No. 74164 |
| Buffer Register | 97 | Texas Instrument No. 74199 |
| Decoder | 113 | Texas Instrument No. 74154 |

Figure 4:
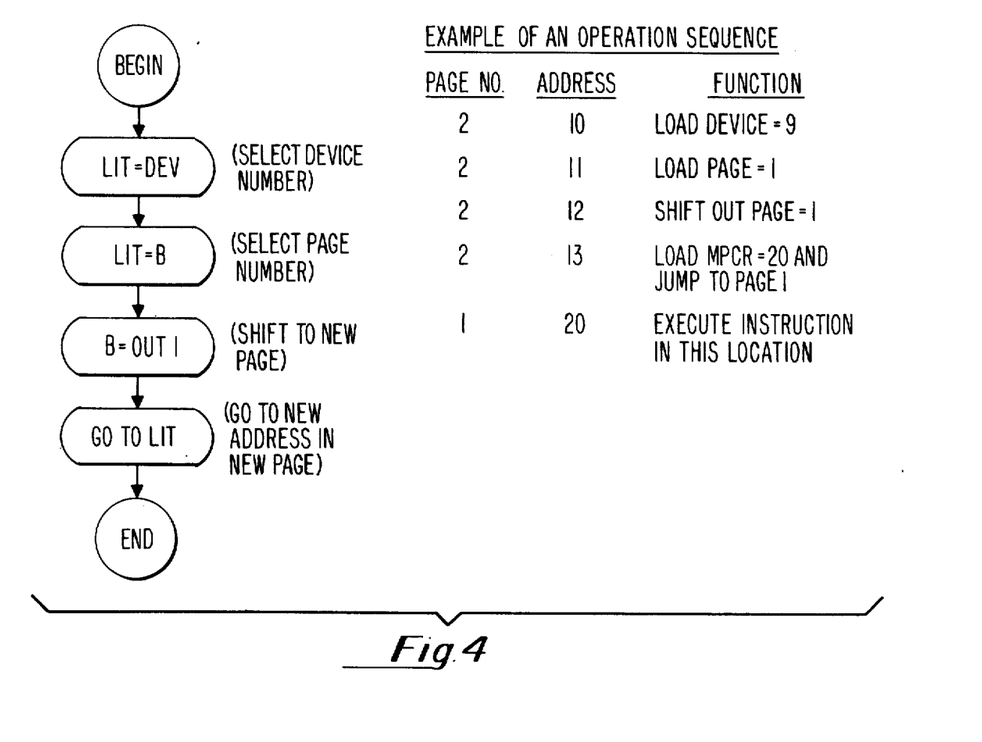
FIG. 4 is a logic flow chart of the microinstructions used to initiate operations within the paging apparatus.

A microinstruction routine as illustrated in FIG. 4 may be used to initiate operation of the paging apparatus. This routine is to be resident in the memory 85 (herein called a page) currently addressed by processor 10.

FIG. 4 shows the flow chart for a sequence of microinstructions, for calling a new page, and for addressing memory locations on that page. FIG. 4 also shows a table of the steps performed wherein the microinstructions specify the calling of a new page. For example, for addressing location 20 of Page 1 from the existing operating memory. The memory in current use is Page 2.

The first microinstruction, LIT=DEV, is the output command which selects a device number. It is an instruction which initiates the connection of a specific input-output device to the processor 10 interface 27. This is an operation by components pre-existing in the basic system.

The second microinstruction LIT=B, defines the B register 19 value to be read. This second microinstruction, LIT=B, defines the B register 19 value to be read as the literal (LIT). This instruction loads the new page number of the next page to be addressed.

The third microinstruction, B=OUT 1, shifts the new page. This means that the B register 19 value is defined equal to the new page number, thus causing the processor 10 in its normal operation to jump to the new page.

The fourth instruction, GO TO LIT, initiates the addressing of the new address in the new page.

Presented in FIG. 4 along with the flow chart of microinstructions is a tabloid presentation of the paging sequence in going from a presently addressed page (2) to a new page (1) and specific location on the page (1), location 20. The microinstructions which control the paging operations are located in locations 10-13 of memory page 2.

Microprogram memory count register MPCR 43 sequentially steps through instructions 10, 11, 12 and 13 of page 2 enabling the circuitry to sequentially perform the following operations: load device = 9, load page = 1, shift out page = 1, load MPCR = 20, and jump to page 1.

Figure 5:
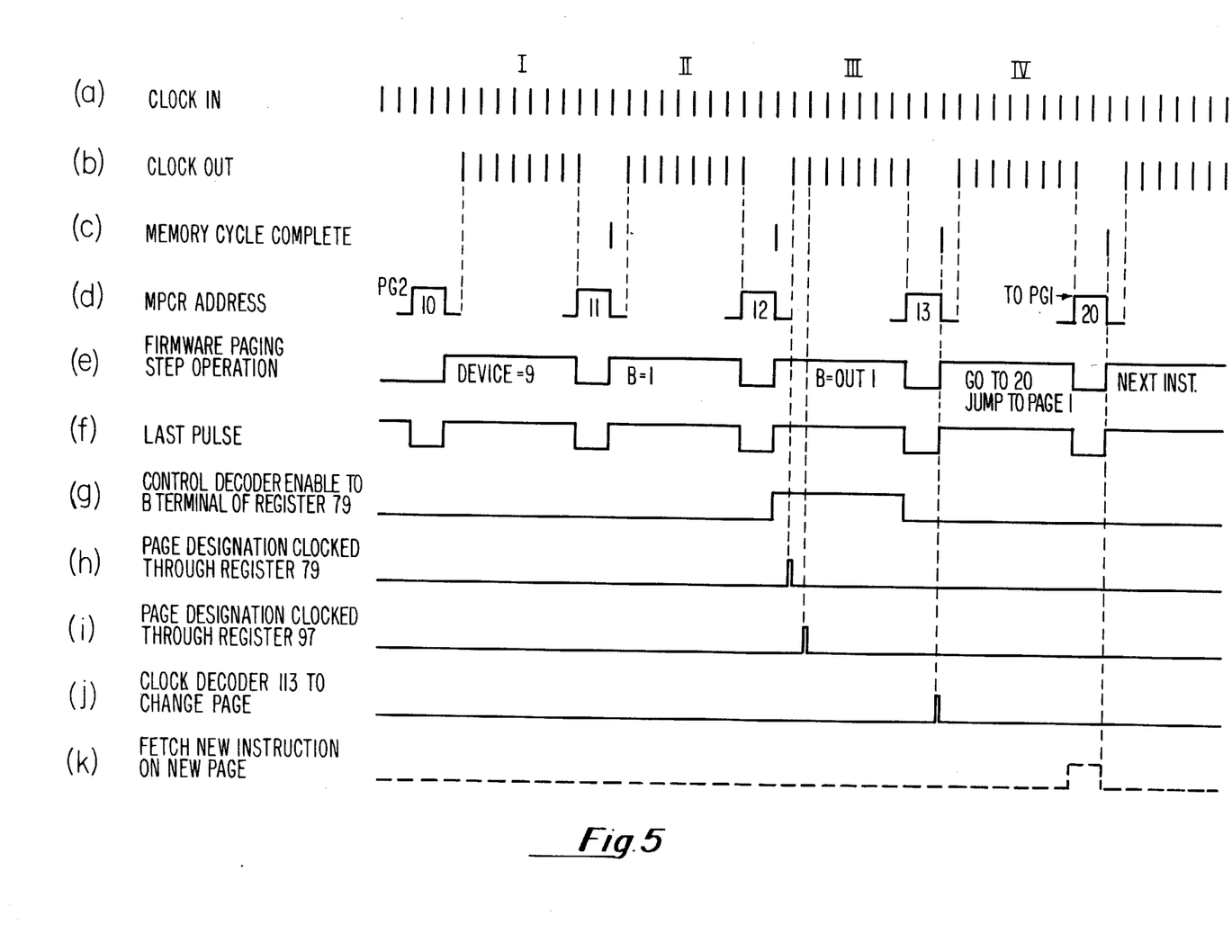
FIG. 5 is a timing diagram for the operation of the paging apparatus.

A timing diagram of microprogram memory page control for the example as discussed above in connection with FIG. 4 is shown in FIG. 5.

Line 1, FIG. 5, shows the clock-in pulses received by the paging circuitry, FIG. 3, and the processor 10, FIG. 1. This pulse train is the basic clock for the entire system.

Clock-out timing pulses as generated by the timing generator 77 and received by the paging circuitry are shown in line 2, FIG. 5.

Line 2, FIG. 5, shows the memory complete pulses generated by the interconnected flip-flops 103, 105 and their associated gating as discussed above. These pulses are generated on a count of two after the last pulse.

Microprogram memory count register 43 address operations are shown in line 4, FIG. 5. Each operation is labelled for the fetch (read) of an instruction from locations 10, 11, 12, 13 of page 2 and 20 of page 1, sequentially, as presented in the example above in connection with the discussion of FIG. 4.

Line 5, FIG. 5, shows the operation periods for performing each of the steps of paging. Each operation cycle is labelled to reflect the sequential steps discussed in the example above and as shown in FIG. 4. In the first period, Device = 9, the I/O device to processor 10 is selected. In the second period, B = 1, the new page designation is entered into B register 19. In the third operation period, B = OUT 1, the paging control instruction is decoded, the page designation data is loaded into register 79, clocked through register 97 as input to decoder 113. During the fourth operation period, JUMP to PAGE 1 and GO TO 20, decoder 113 is clocked to enable reading of the new page while the new instruction location is addressed on this new page.

Last pulses as received from the timing generator 77 are shown in line 6, FIG. 5.

Line 7 is the control decode enable to register 79.

The new page designation word clock through register 79 is shown in line 8.

Line 9 represents the clocking of register 97 and the data transmission out of this register of the new page designate.

Line 10 shows the clocking of decoder 113 which decodes the page designate to enable the read terminal of one of the memories 85.

The MPCR 43 operation which fetches the next (new) instruction 20 from the next (new) page is redrawn from line 4 to line 11.

What has been shown and described in the foregoing is a method and means of expanding the memory capacity of a serial bit, programmable microinstruction processor. While many different embodiments of the above-described invention could be made without departing from the scope thereof, it is intended that the above-description not be taken in the limiting sense, but be interpreted as illustrative of a best mode for a particular application as developed by the inventor.

What is claimed is:

1. An expanded memory microprocessing system comprising:

a plurality of microprogram memory pages, each page therein for storing a plurality of addressable microinstructions;

a microprogrammable microprocessor for sequentially executing microinstructions, said microprocessor having a single address register of size sufficient to address only a single microprogram memory page, means for designating a particular microprogram memory page in said plurality of pages, and an instruction register for receiving microinstructions prior to the executing thereof;

means connecting said plurality of memory pages with said address register for addressing in parallel all pages in said plurality of pages;

means external to said microprocessor and responsive to said designating means for enabling said particular page designated thereby; and means for fetching an addressed microinstruction from an enabled page and for transferring said addressed microinstruction to said instruction register.

2. The expanded memory microprocessing system according to claim 1 wherein each page in said plurality of pages includes a read enable input;

said means for designating provides a serial designation of said particular microprogram memory page; and said means responsive to said designating means for enabling said particular page includes a serial to parallel transfer register for converting said serial designation into a parallel designation, and a decoder inputted by said parallel designation and outputted to all pages in said plurality of pages for providing an enabling signal to said read enable input of said particular page designated by said means for designating.

3. The expanded memory microprocessing system according to claim 2 wherein said microprocessor further includes means for sequentially activating in order said means for designating, said means for enabling, and said means for addressing.

4. The expanded memory microprocessing system according to claim 3 wherein
said means for fetching and for transferring transfers said addressed microinstruction in parallel to said instruction register.

5. The expanded memory microprocessing system according to claim 1 wherein said microprocessor further includes
means for sequentially activating in order said means for designating, said means for enabling, and said means for addressing.

6. The expanded memory microprocessing system according to claim 5 wherein
each page in said plurality of pages includes a read enable input; and
said means for enabling includes means for providing an enable signal to said read enable input of said particular page designated by said means for designating.

7. The expanded memory microprocessing system according to claim 6 wherein
said means for fetching and for transferring transfers said addressed microinstruction in parallel to said instruction register.

* * * * *